United States Patent
Bronzi et al.

(10) Patent No.: US 10,591,754 B1
(45) Date of Patent: Mar. 17, 2020

(54) ELECTRO-OPTIC MODULATORS AND METHODS FOR MODULATING OPTICAL RADIATION

(71) Applicant: Sicoya GmbH, Berlin (DE)

(72) Inventors: Danilo Bronzi, Berlin (DE); Ahmet Mert Özdemir, Berlin (DE)

(73) Assignee: SICOYA GMBH, Berlin (DE)

( * ) Notice: Subject to any disclaimer, the term of this patent is extended or adjusted under 35 U.S.C. 154(b) by 0 days.

(21) Appl. No.: 16/366,783

(22) Filed: Mar. 27, 2019

(51) Int. Cl.
*G02F 1/01* (2006.01)
*G02F 1/35* (2006.01)

(52) U.S. Cl.
CPC .......... *G02F 1/0121* (2013.01); *G02F 1/3515* (2013.01)

(58) Field of Classification Search
None
See application file for complete search history.

(56) References Cited

U.S. PATENT DOCUMENTS

| | | | |
|---|---|---|---|
| 8,320,720 B2 | 11/2012 | Webster et al. | |
| 10,128,957 B2 * | 11/2018 | Welch | H04B 10/516 |

OTHER PUBLICATIONS

Wan-Jou Huang, et al.,"Optical DAC for Generation of PAM4 Using Parallel Electro-Absorption Modulators"; ECOC 2016; 42nd European Conference and Exhibition on Optical Communications; Sep. 18-22, 2016—Dusseldorf, Germany; VDE VERLANG GMBH—Berlin, Offenbach; ISBN 978-3-8007-4274-5; pp. 1118-1120.

* cited by examiner

*Primary Examiner* — Jerry Rahll
(74) *Attorney, Agent, or Firm* — Gordon Rees Scully; Mansukhani LLP (57) ABSTRACT

An exemplary embodiment of the present invention relates to an electro-optic modulator for modulating optical radiation. The electro-optic modulator comprises at least one upstream modulation subunit, at least one downstream modulation subunit and at least one phase-matching unit. The upstream and downstream modulation subunits are optically connected in series such that the optical radiation passes the downstream modulation subunit after passing the upstream modulation subunit. An electrical upstream modulation signal may be applied to the upstream modulation subunit, and an electrical downstream modulation signal may be applied to the downstream modulation subunit. The phase-matching unit is configured to delay the downstream modulation signal such that a phase difference between the upstream modulation signal and the downstream modulation signal is minimal.

18 Claims, 6 Drawing Sheets

ELECTRO-OPTIC MODULATORS AND METHODS FOR MODULATING OPTICAL RADIATION

The invention relates to electro-optic modulators and methods for modulating optical radiation.

BACKGROUND OF THE INVENTION

Due to the continuous growth in data traffic and bandwidth requirements, faster optical interconnects are urgently needed. This—in turn—entails an increasing demand of low-power high-speed optical transceivers. In order to meet this demand, a shift towards advanced modulation formats, such as multi-level signaling, seems promising. For example, a 4-level pulse-amplitude modulation (PAM4) signal needs half of the bandwidth of a typical non-return-to-zero (NRZ) signal.

However, multi-level signaling is known to be more sensitive to the linearity of components. In an optical system, the electro-optical modulator is usually the most non-linear element, as its transfer function is typically strongly bias- and voltage-dependent, so that the generation of a clean PAM4 eye requires, often, a power-hungry electrical digital-to-analog converter (DAC) or pre-distortion of the electrical signal to produce equidistant optical levels.

In order to alleviate these issues, the modulators can be arranged in a 2-bit optical DAC configuration, as described in a paper by W. Huang et al. entitled "Optical DAC for Generation of PAM4 Using Parallel Electro-Absorption Modulators" ECOC 2016; 42nd European Conference on Optical Communication, Dusseldorf, Germany, 2016, pp. 1-3). This approach, where each modulator is employed to create a binary NRZ signal, permits to bypass the non-linearity of the modulator, thus removing the linearity constraints from the transmitter side—in both the electrical and optical domain—and enabling the use of simpler low-power NRZ driver topologies.

A similar approach can be used in a variety of advanced modulation formats other than PAM4, as shown in U.S. Pat. No. 8,320,720 B2.

OBJECTIVE OF THE PRESENT INVENTION

An objective of the present invention is to provide an improved electro-optic modulator for modulating optical radiation.

A further objective of the present invention is to provide an improved method of modulating optical radiation.

BRIEF SUMMARY OF THE INVENTION

An exemplary embodiment of the present invention relates to an electro-optic modulator for modulating optical radiation comprising at least one upstream modulation subunit, at least one downstream modulation subunit and at least one phase-matching unit. The upstream and downstream modulation subunits are optically connected in series such that the optical radiation passes the downstream modulation subunit after passing the upstream modulation subunit. The upstream modulation subunit comprises an upstream electrode, wherein a proximal end of the upstream electrode is adapted for receiving an electrical upstream modulation signal and located in an optical upstream section where the radiation enters the upstream modulation subunit. A distal end of the upstream electrode is located in an optical downstream section where the radiation leaves the upstream modulation subunit. The downstream modulation subunit comprises a downstream electrode. A proximal end of the downstream electrode is adapted for receiving an electrical downstream modulation signal and located in an optical upstream section where the radiation enters the downstream modulation subunit. A distal end of the downstream electrode is located in an optical downstream section where the radiation leaves the downstream modulation subunit. The phase-matching unit is configured to delay the downstream modulation signal such that a phase difference between the upstream modulation signal at the distal end of the upstream electrode and the downstream modulation signal at the proximal end of the downstream electrode is minimal.

The phase-matching unit preferably comprises a tunable delay line configured to delay the downstream modulation signal in response to a control signal.

A phase detector of the phase-matching unit is preferably connected to the distal end of the upstream electrode and the proximal end of the downstream electrode. The phase detector may be configured to generate the control signal which indicates the phase difference between the distal end and the proximal end.

A first monostable is preferably arranged between the distal end of the upstream electrode and a first input port of the phase detector.

A second monostable is preferably arranged between the distal end of the downstream electrode and a second input port of the phase detector.

A low-pass filter is preferably arranged between an output port of the phase detector and an input port of the tunable delay line.

The tunable delay line may be a digitally-controlled delay line.

An analog-digital converter may be arranged between the output port of the low-pass filter and the input port of the digitally-controlled delay line.

The modulation subunits are preferably phase modulators, amplitude modulators, polarization modulators, injection modulators, or depletion modulators.

The modulation units may provide any type of driving scheme (e.g. segmented driver, travelling-wave electrode, segmented travelling-wave electrode, etc. . . . ).

An electrical driver is preferably assigned to the downstream modulation subunit. The driver may be configured to receive an electrical input signal and generate the electrical downstream modulation signal for the downstream modulation subunit.

The driver is preferably electrically arranged between the tunable delay line and the proximate end of the downstream electrode.

The driver and the modulation subunits are preferably integrated on the same chip. The tunable delay line may also be are integrated on this same chip.

In another preferred embodiment, the driver and the modulation subunits may be integrated on the same chip and the tunable delay line may be integrated on another chip.

The driver is preferably configured to process (receive and transmit) differential and/or non-differential input signals.

Depending on whether the output interface of the driver(s) is single-ended or differential-ended, the assigned modulation subunit(s) preferably comprises a single electrode (in case of non-differential input signal) or two electrodes (in case of differential input signals).

A controller may be configured to activate and deactivate the phase-matching unit intermittently and operate the phase-matching unit in compensation cycles.

In the latter embodiment, an analog-digital converter is preferably arranged between the output port of the low-pass filter and the input port of the tunable delay line. The tunable delay line is preferably a digitally-controlled delay line. The analog-digital converter is preferably configured to store its digital values and output the stored values during the deactivation of the phase-matching unit until new analog values are provided by the low-pass filter in the next compensation cycle.

The electro-optic modulator may comprise a plurality of modulation subunits being arranged in series, and a plurality of phase-matching units. Each modulation subunit, except the last one in the series of modulation subunits, is preferably an upstream modulation subunit in a pair of modulation subunits that is formed by the latter modulation subunit and the consecutive downstream modulation subunit. A phase-matching unit is preferably assigned to each pair of modulation subunits. Each phase-matching unit is preferably configured to delay the downstream modulation signal that is applied to the respective downstream modulation subunit such that the phase difference between the upstream modulation signal at the distal end of the upstream electrode of the upstream modulation subunit and the downstream modulation signal at the proximal end of the downstream electrode of the downstream modulation subunit is minimal.

An electrical driver may be assigned to each modulation subunit. Each driver may be configured to receive an electrical input signal and generate an electrical modulation signal for the respective modulation subunit.

For each modulation subunit, except the first one in the series of modulation subunits, the driver is preferably electrically arranged between the proximate end of the electrode of the respective modulation subunit and a tunable delay line of the assigned phase-matching unit.

A further embodiment of the present invention relates to a method of generating modulated optical output radiation based on optical input radiation, the method comprising the steps of receiving the input radiation at at least one upstream modulation subunit, modulating the radiation in said at least one upstream modulation subunit and thereafter modulating the radiation again in a consecutive downstream modulation subunit, wherein the at least one upstream modulation subunit comprises an upstream electrode, wherein a proximal end of the upstream electrode receives an electrical upstream modulation signal and is located in an optical upstream section where the radiation enters the upstream modulation subunit, and wherein a distal end of the upstream electrode is located in an optical downstream section of the upstream modulation subunit where the radiation leaves the upstream modulation subunit, wherein the consecutive downstream modulation subunit comprises a downstream electrode, wherein a proximal end of the downstream electrode receives an electrical downstream modulation signal and is located in an optical upstream section where the radiation enters the downstream modulation subunit, and wherein a distal end of the downstream electrode is located in an optical downstream section of the downstream modulation subunit where the radiation leaves the downstream modulation subunit, and wherein the downstream modulation signal is delayed such that a phase difference between the upstream modulation signal at the distal end of the upstream electrode and the downstream modulation signal at the proximal end of the downstream respective electrode is minimal.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
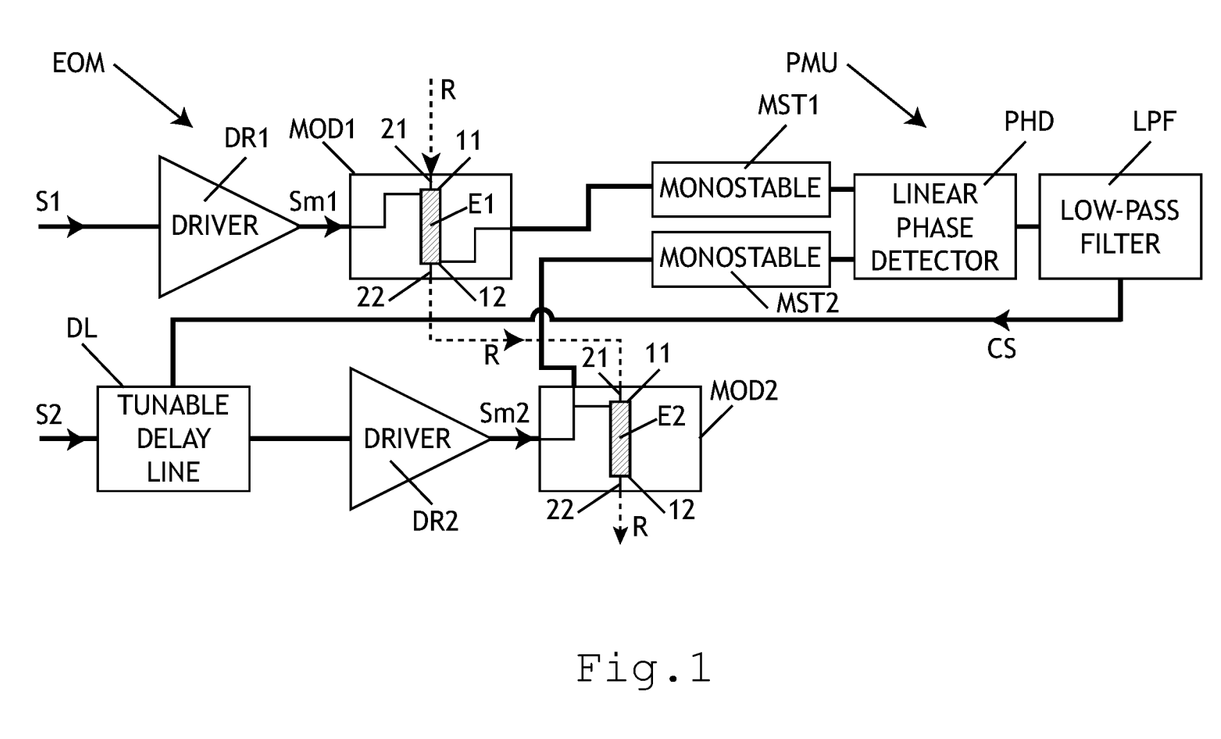
FIG. 1 illustrates a first exemplary embodiment of an electro-optic modulator according to the present invention, wherein a tunable delay line is an analog delay line.

FIG. 1 shows a first exemplary embodiment of an electro-optic modulator EOM according to the present invention. The electro-optic modulator EOM is configured to modulate optical radiation R and comprises a first modulation subunit MOD1, a second modulation subunit MOD2 and a phase-matching unit PMU.

The first and second modulation subunits are optically connected in series such that the optical radiation R passes the second modulation subunit after passing the first modulation subunit. Therefore, the first modulation subunit is hereinafter referred to as upstream modulation subunit MOD1, and the second modulation subunit is hereinafter referred to as downstream modulation subunit MOD2.

The upstream modulation subunit MOD1 comprises an upstream electrode E1. A proximal end 11 of the upstream electrode E1 is adapted for receiving an electrical upstream modulation signal Sm1 and located in an optical upstream section 21 where the radiation R enters the upstream modulation subunit MOD1. A distal end 12 of the upstream electrode E1 is located in an optical downstream section 22 where the radiation R leaves the upstream modulation subunit MOD1.

The downstream modulation subunit MOD2 comprises a downstream electrode E2. A proximal end 11 of the downstream electrode E2 is adapted for receiving an electrical downstream modulation signal Sm2. The proximal end 11 is located in an optical upstream section 21 where the radiation R enters the downstream modulation subunit MOD2. A distal end 12 of the downstream electrode E2 is located in an optical downstream section 22 where the radiation R leaves the downstream modulation subunit MOD2.

The phase-matching unit PMU is configured to delay the downstream modulation signal Sm2 such that a phase difference between the upstream modulation signal Sm1 at the distal end 12 of the upstream electrode E1 and the downstream modulation signal Sm2 at the proximal end 11 of the downstream electrode E2 is minimal.

In exemplary embodiment of FIG. 1, the phase-matching unit PMU comprises a first monostable MST1, a second monostable MST2, a phase detector PHD, a low-pass filter LPF and a tunable delay line DL.

The first monostable MST1 is arranged between the distal end 12 of the upstream electrode E1 and a first input port of the phase detector PHD. The second monostable MST2 is arranged between the distal end 12 of the downstream electrode E2 and a second input port of the phase detector PHD.

Since the phase detector PHD of the phase-matching unit PMU is connected (via the monostables MST1, MST2) to the distal end 12 of the upstream electrode E1 and the proximal end 11 of the downstream electrode E2, the phase detector PHD may generate an output signal which indicates the phase difference between signals at the distal and proximal ends 11, 12. The output signal of the phase detector PHD controls the tunable delay line DL and is hereinafter referred to as control signal CS.

As shown in FIG. 1, a low-pass filter LPF is preferably arranged between an output port of the phase detector PHD and the input port of the tunable delay line DL. The cut-off frequency of the low-pass filter LPF is preferably chosen such that the closed-loop pole is at least four orders of magnitude slower than the data rate.

In the exemplary embodiment of FIG. 1, electrical drivers DR1, DR2 are assigned to the upstream modulation subunit MOD1 and the downstream modulation subunit MOD2. A first driver DR1 is configured to receive a first electrical input signal S1 and generate the electrical upstream modulation signal Sm1 for the upstream modulation subunit MOD1. A second driver DR2 is configured to receive a second electrical input signal S2 and generate the electrical downstream modulation signal Sm2 for the downstream modulation subunit MOD2.

In the exemplary embodiment of FIG. 1, the second driver DR2 is electrically arranged between the tunable delay line DL and the proximate end of the downstream electrode E2. Therefore, the tunable delay line DL may compensate the unequal delay induced by the first driver DR1 and the second driver DR2.

The electro-optic modulator EOM of FIG. 1 may be operated to generate a PAM4 signal based on two bits, hereafter referred to as most-significant bit (MSB) and least-significant bit (LSB). The upstream modulation signal Sm1 may be used to input the MSB, and the downstream signal may be used to input the LSB, or vice versa.

A critical issue for the generation of the PAM4 signal is the differential skew control between the upstream modulation signal Sm1 and the downstream modulation signal Sm2. In the exemplary embodiment of FIG. 1, the finite propagation speed of the light in the upstream modulation subunit MOD1 may introduce a delay proportional to its length, so that—in order to produce an ideal PAM4 signal— the electrical downstream modulation signal Sm2 is preferably skewed by an amount equal to the delay introduced by the upstream modulation subunit MOD1. This skew can be produced by the tunable delay line DL. Any deviation from the ideal skew may result in a severe degradation of the PAM4-signal. This is extremely pronounced for high-speed signals, e.g. for a PAM4 56G serial link.

More generally, if we indicate with $Td1$, $Tm1$, $Tdelay$, $Td2$ the delay introduced respectively by the first driver DR1, the upstream modulation subunit MOD1, the delay line DL and the second driver DR2, in order to generate an ideal PAM4 signal, the following equivalence must hold:

$$Td1+Tm1=Td2+Tdelay \tag{1}$$

In the ideal case the driver delays are equal, and Equation (1) becomes:

$$Tm1=Tdelay \tag{2}$$

In reality, while the optical delay is stable over process, temperature and operating conditions, the delays introduced by the first and second drivers DR1, DR2 may differ due to both process mismatches, which induce a static differential skew, and working conditions (such as voltage, temperature, settings) which may continuously vary, thus causing a dynamic differential skew.

Even if the static differential skew can be cancelled by a proper calibration of the delay line DL, the dynamic skew remains uncompensated, so basically one can rewrite Equation (2) as:

$$Tm1=Tdelay+\Delta Td(t) \tag{3}$$

where $\Delta Td(t)$ denotes the time-dependent skew between the drivers DR1, DR2.

In the exemplary embodiment of FIG. 1, the delay compensation loop that is provided by the phase detector PHD and the tunable delay line DL may automatically compensate for both static and dynamic differential skew, delivering the best performance for a multi-level signal. To this end, the electrical downlink modulation signal may be phase-matched with the optical signal. More specifically, the optical delay introduced by the upstream modulation subunit MOD1 is sensed at the electrical level—at the distal end 12 of the electrode of the upstream modulation subunit MOD1 and at the proximal end 11 of the electrode of the downstream modulation subunit MOD2. The linear phase detector PHD compares the skew between the electrical signals at both ends and generates a corresponding control signal CS. The signal is preferably low-pass filtered and then used to control the tunable delay line DL, in order to align the electrical downlink and uplink modulation signals Sm1, Sm2. Since the proposed delay compensation loop works with random streams of data, the monostables MST1, MST2 are preferably present in front of the phase detector PHD in order to create a pulse of finite time duration.

The tunable delay line DL preferably generates a variable skew $\Delta Tdelay(t)$ in the path, so that:

$$Tm1=Tdelay+\Delta Tdelay(t)+\Delta Td(t) \tag{4}$$

In other words, a purpose of the delay compensation loop is to modify the variable skew in order to cancel any delay discrepancy in the signal path, such that:

$$\Delta T\text{delay}(t)+\Delta Td(t)=0 \qquad (5)$$

The delay compensation loop may either consist of analog blocks only, as shown in the exemplary embodiment of FIG. 1, or additionally or alternatively include digital circuitry. Exemplary implementations that include also digital circuitry are shown in FIGS. 2, 3 and 4.

Figure 2:
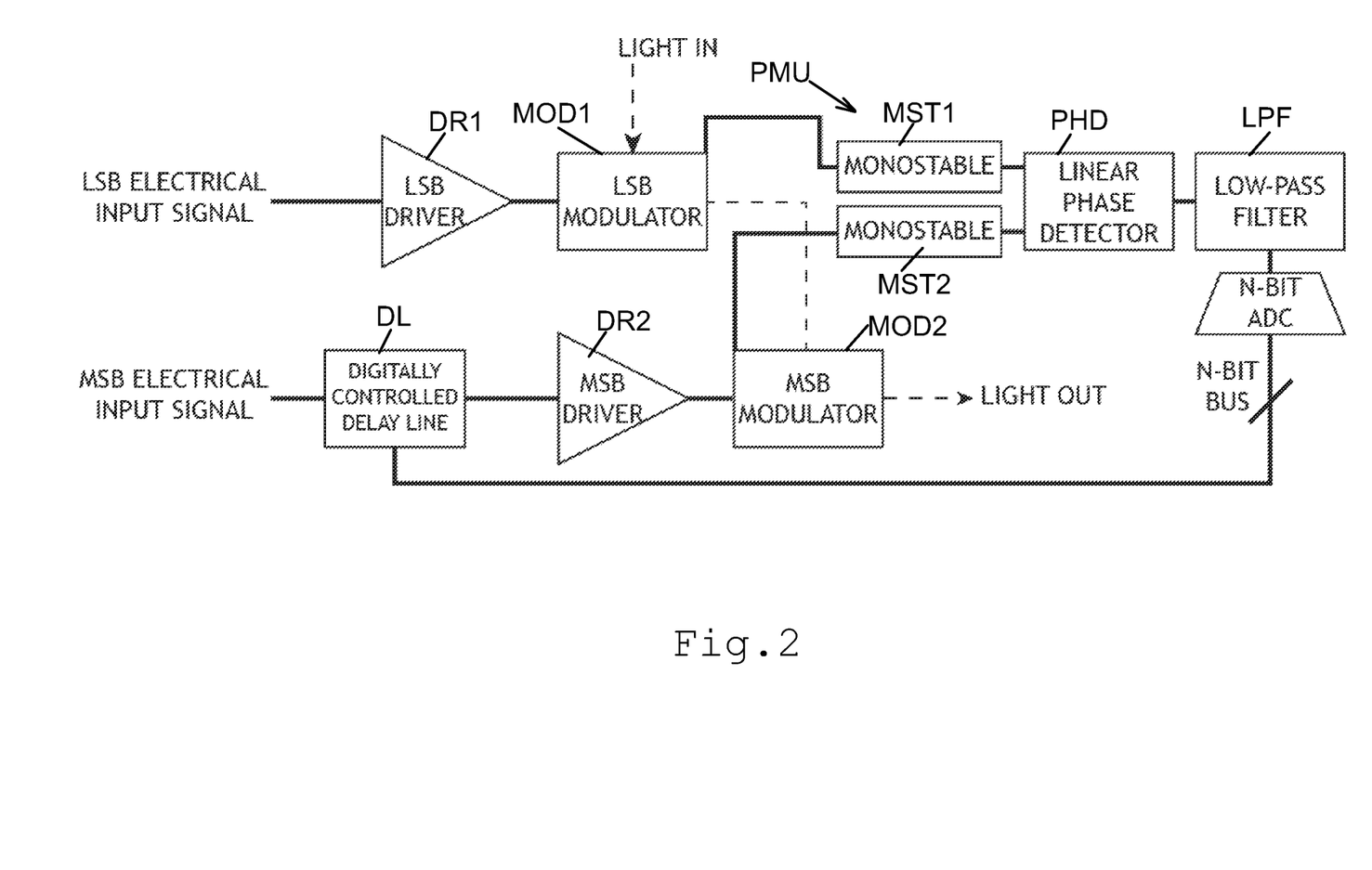
FIG. 2 illustrates a second exemplary embodiment of an electro-optic modulator according to the present invention, wherein the tunable delay line is a digitally controlled delay line.

In the exemplary embodiment of FIG. 2, the low-pass-filtered output signal of the phase detector PHD is digitized by an analog-digital-converter ADC, whose output controls a digitally-controlled delay line DL.

Since typical dynamic changes occur very slowly, the compensation loop can be periodically enabled in low duty cycle mode, in order to decrease the current consumption, having negligible impact on the chip power dissipation. For instance, a controller (as shown in FIG. 3) may be configured to activate and deactivate the phase-matching unit PMU (e.g. the monostables MST1, MST2, the phase detector PHD, and/or the low-pass filter LPF) intermittently and operate the phase-matching unit PMU in compensation cycles. The analog-digital converter is preferably configured to store its digital values and output the stored values during the deactivation of the phase-matching unit PMU until new analog values are provided by the low-pass filter LPF in the next compensation cycle.

Figure 3:
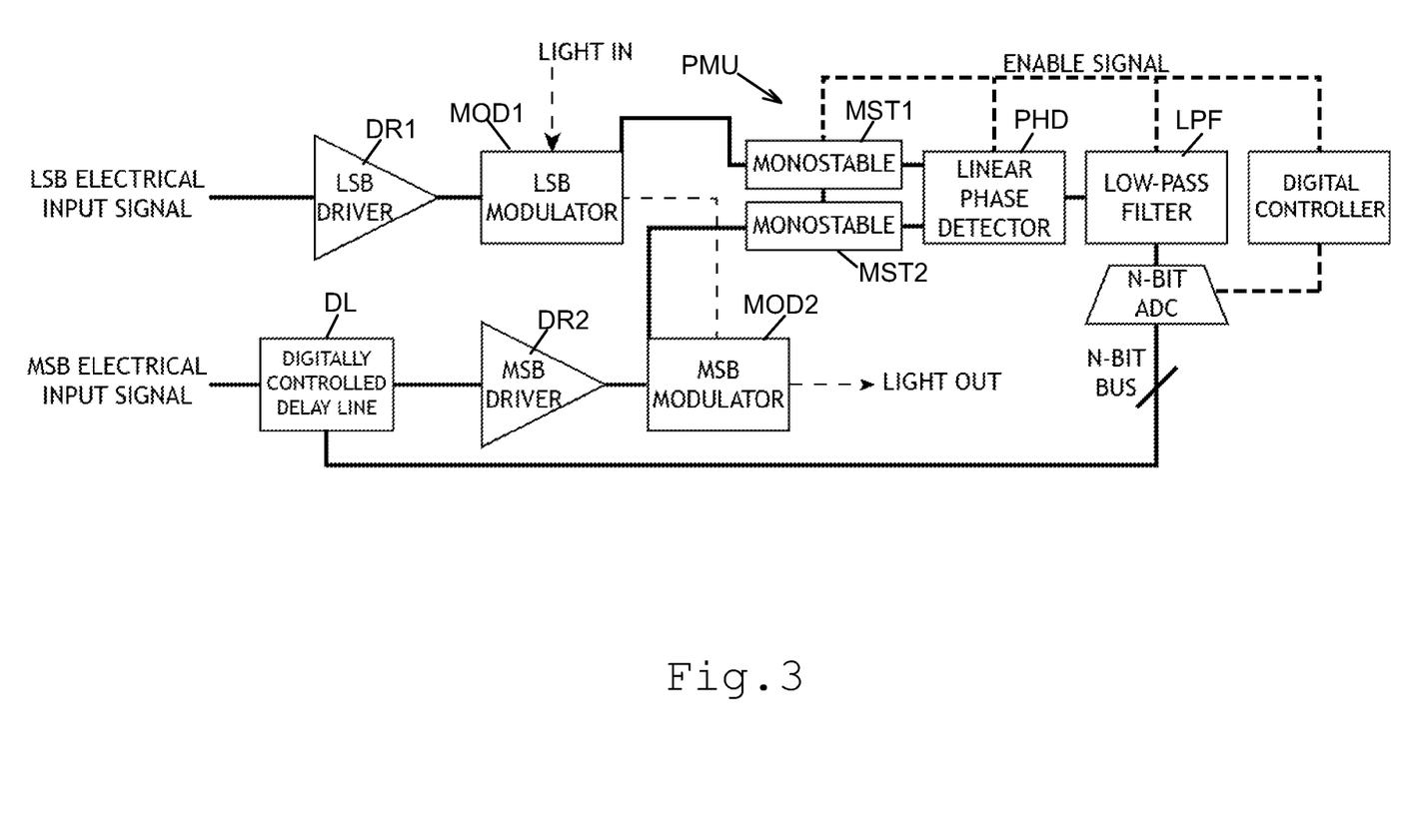
FIG. 3 illustrates a third exemplary embodiment of an electro-optic modulator according to the present invention, wherein a digital controller provides an energy-saving mode.
Figure 4:
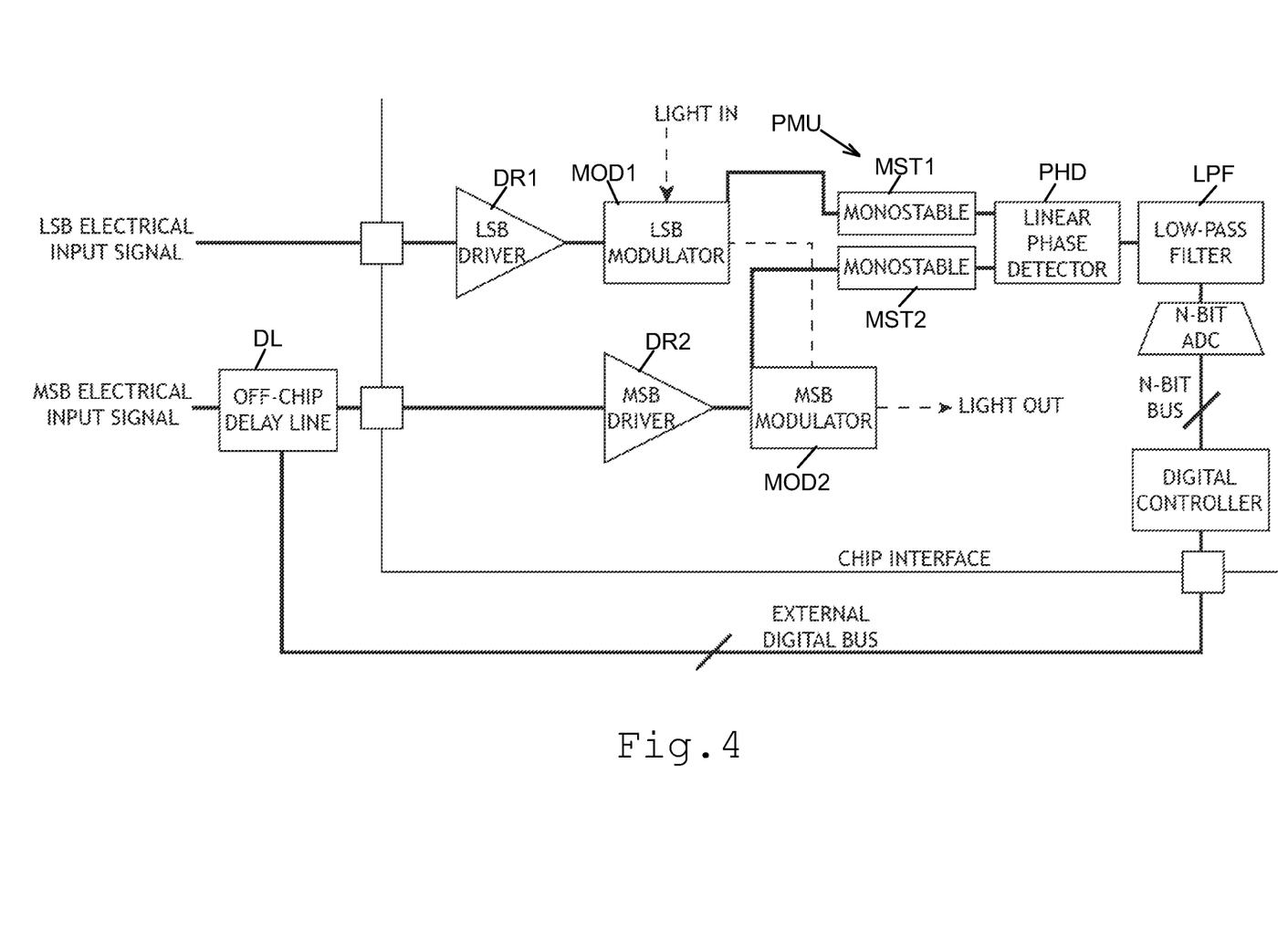
FIG. 4 illustrates a fourth exemplary embodiment of an electro-optic modulator according to the present invention, wherein the tunable delay line is integrated on a separate chip.

In the exemplary embodiments of FIGS. 1, 2 and 3, the drivers DR1, DR2 and the modulation subunits and the tunable delay line DL are preferably integrated on the same chip.

Alternatively as shown in FIG. 4, the drivers DR1, DR2 and the modulation subunits MOD1, MOD2 may be integrated on the same chip and the tunable delay line DL may be integrated on another chip. Here the low-pass filter LPF output is digitized by an analog-to-digital converter ADC, and via a digital interface passed to an external digitally controlled delay line DL.

Figure 5:
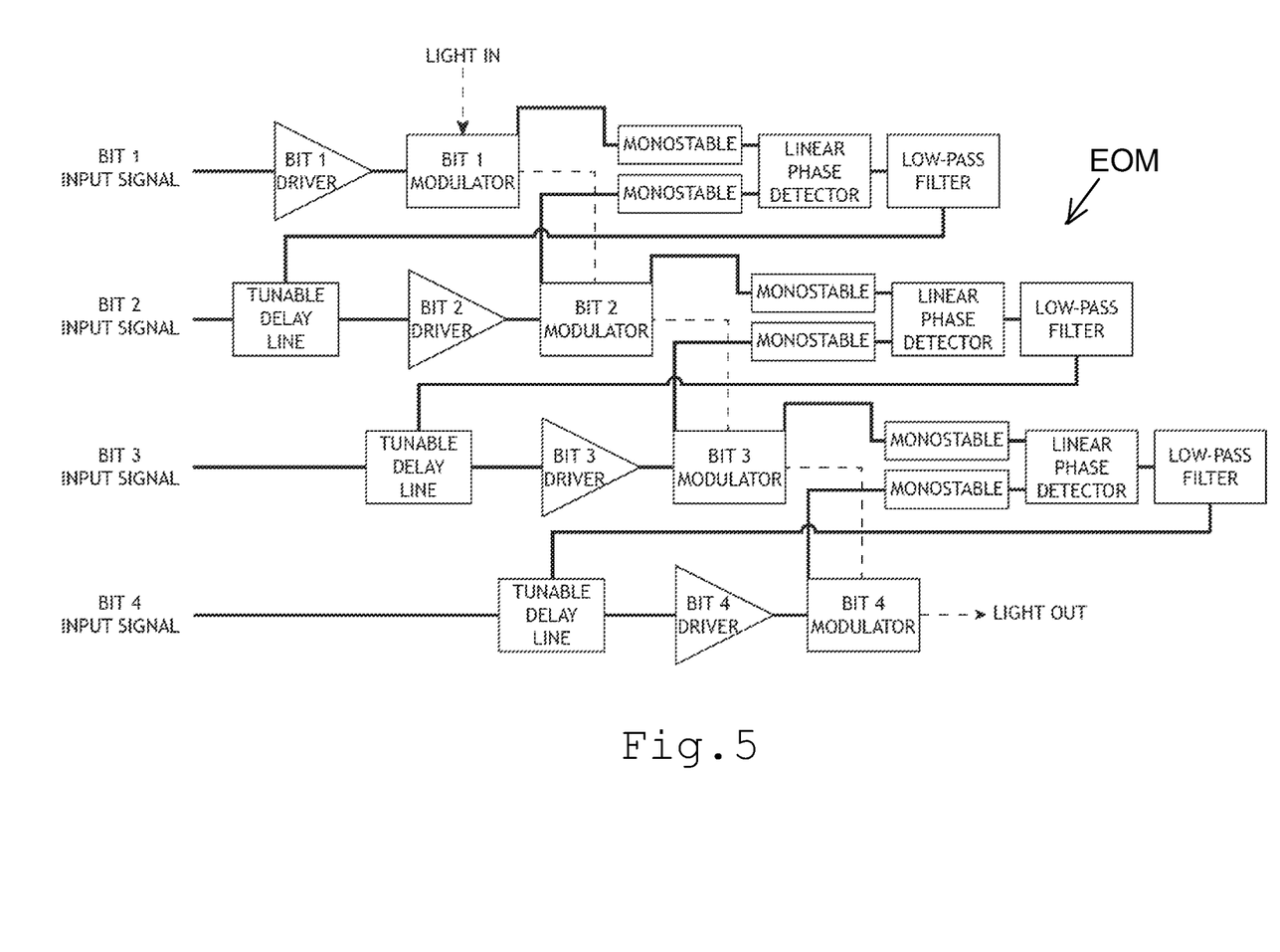
FIG. 5 illustrates a fifth exemplary embodiment of an electro-optic modulator according to the present invention, wherein the modulator comprises a plurality of cascaded modulation subunits.

By way of a further example, FIG. 5 shows that the principles of operation described above with reference to FIGS. 1-4 may also be extended to any other modulation scheme where a precise delay between different bits or channels is advantageous. For instance, as shown in FIG. 5, the approach may be implemented in a PAM-16 modulation scheme.

In the exemplary embodiment of FIG. 5, the electro-optic modulator EOM comprises a plurality of modulation subunits that are arranged in series, and a plurality of phase-matching units. Each modulation subunit, except the last one in the series of modulation subunits, is an upstream modulation subunit in a pair of modulation subunits that is formed by the latter modulation subunit and the consecutive downstream modulation subunit. A phase-matching unit is assigned to each pair of modulation subunits. Each phase-matching unit is preferably configured to delay the downstream modulation signal that is applied to the respective downstream modulation subunit such that the phase difference between the upstream modulation signal at the distal end of the upstream electrode of the upstream modulation subunit and the downstream modulation signal at the proximal end of the downstream electrode of the downstream modulation subunit is minimal.

Regarding the delay, the explanations above with reference to FIG. 1 apply correspondingly for each pair of modulation subunits.

In the exemplary embodiment of FIG. 5, an electrical driver is assigned to each modulation subunit. Each driver is configured to receive an electrical input signal and generate an electrical modulation signal for the respective modulation subunit. For each modulation subunit, except the first one in the series of modulation subunits, the driver is electrically arranged between the proximate end of the electrode of the respective modulation subunit and a tunable delay line of the assigned phase-matching unit.

The principles of operation described above by way of example may be applied to any type of optical modulators (e.g. phase modulators, amplitude modulators, polarization modulators, injection modulators, depletion modulators, etc. . . . ) and to any type of driving scheme (e.g. segmented driver, travelling-wave electrode, segmented travelling-wave electrode, etc. . . . ).

Co-integration of the drivers and the electro-optical modulators may usually offer the best performance, given the absence of additional parasitic elements such as pad/wire stray capacitance and inductance that would otherwise degrade the RF signal on the modulator electrode and disturb the propagation delay on the high-speed connection to the delay compensation loop circuit.

Figure 6:
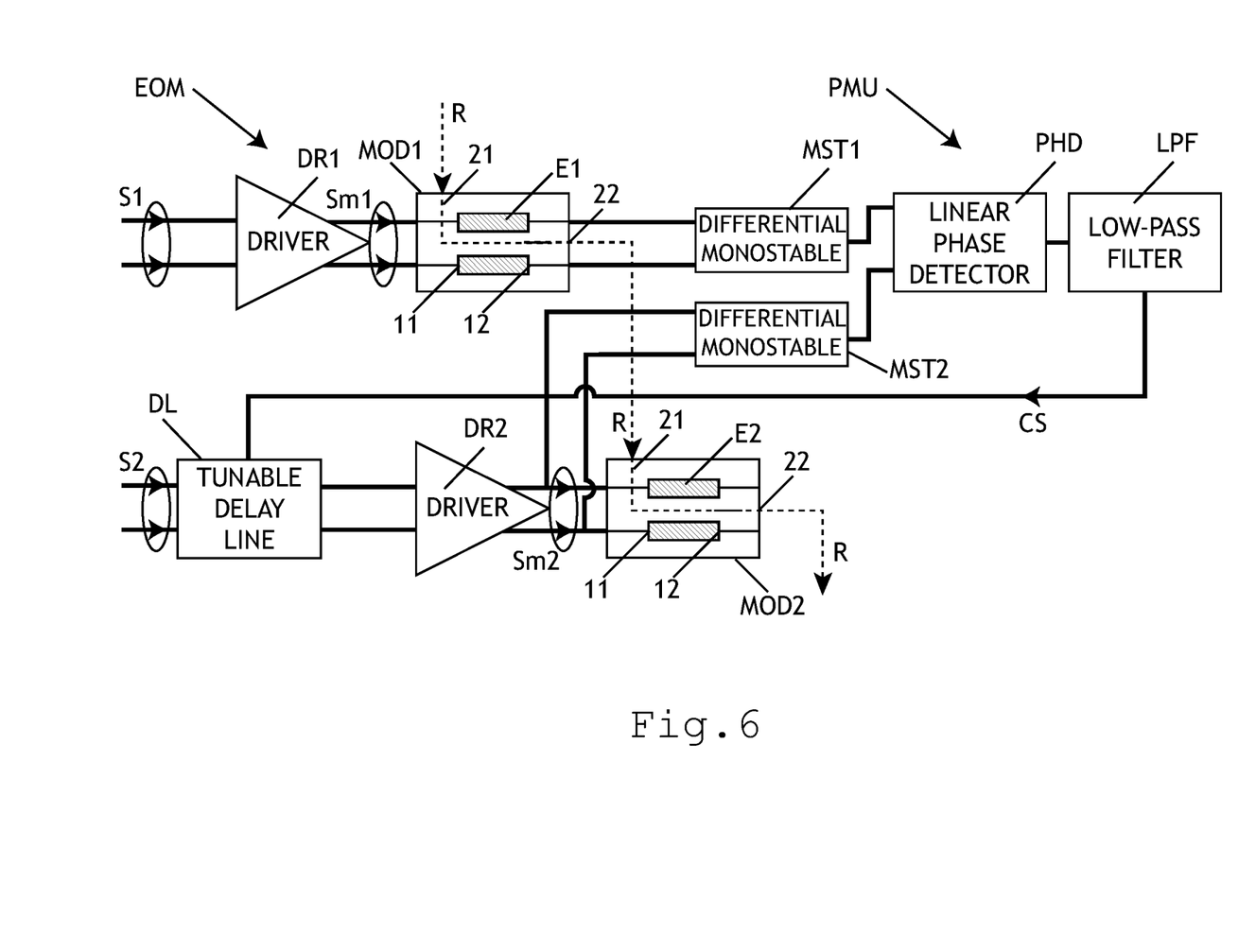
FIG. 6 illustrates a sixth exemplary embodiment of an electro-optic modulator according to the present invention, wherein drivers and modulations subunits operate based on differential signals.

For illustration purposes, the exemplary embodiments of FIGS. 1-5 show drivers and modulation subunits that operate based on non-differential signals. Of course, the drivers may also be configured to receive and process differential signals. In this case, the modulation subunits are preferably configured to receive differential signals and modulate the radiation based on the differential modulation signals. To this end, the modulation subunits may comprise two electrodes which are preferably arranged in parallel. The phase-matching unit described above may be connected to and operated with any of the two electrodes as described above. FIG. 6 shows an exemplary embodiment of an electro-optic modulator EOM based on differential signals.

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the world "or" and vice versa, and any combination thereof.

In the drawings and specification, there have been disclosed a plurality of embodiments of the present invention. The applicant would like to emphasize that each feature of each embodiment may be combined with or added to any other of the embodiments in order to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one ore more) of the present dependent claims (regardless of the present claim structure). Therefore, the applicant may direct further patent claims towards other claim combinations at a later stage of the prosecution.

The invention claimed is:

1. Electro-optic modulator for modulating optical radiation comprising at least one upstream modulation subunit, at least one downstream modulation subunit and at least one phase-matching unit, wherein the upstream and downstream modulation subunits are optically connected in series such that the optical radiation passes the downstream modulation subunit after passing the upstream modulation subunit, wherein the upstream modulation subunit comprises an upstream electrode, wherein a proximal end of the upstream electrode is adapted for receiving an electrical upstream modulation signal and located in an optical upstream section where the radiation enters the upstream modulation subunit, and wherein a distal end of the upstream electrode is located in an optical downstream section where the radiation leaves the upstream modulation subunit, wherein the downstream modulation subunit comprises a downstream electrode, wherein a proximal end of the downstream electrode is adapted for receiving an electrical downstream modulation signal and located in an optical upstream section where the radiation enters the downstream modulation subunit, and wherein a distal end of the downstream electrode is located in an optical downstream section where the radiation leaves the downstream modulation subunit, wherein the phase-matching unit is configured to delay the downstream modulation signal such that a phase difference between the upstream modulation signal at the distal end of the upstream electrode and the downstream modulation signal at the proximal end of the downstream electrode is minimal, wherein the phase-matching unit comprises a tunable delay line configured to delay the downstream modulation signal in response to a control signal, and wherein a phase detector of the phase-matching unit is connected to the distal end of the upstream electrode and the proximal end of the downstream electrode, and configured to generate the control signal which indicates the phase difference between the distal end and the proximal end.

2. Electro-optic modulator of claim 1,
wherein a first monostable is arranged between the distal end of the upstream electrode and a first input port of the phase detector, and
wherein a second monostable is arranged between the distal end of the downstream electrode and a second input port of the phase detector.

3. Electro-optic modulator of claim 1, wherein a low-pass filter is arranged between an output port of the phase detector and an input port of a tunable delay line.

4. Electro-optic modulator of claim 3,
wherein the tunable delay line is a digitally-controlled delay line, and
wherein an analog-digital converter is arranged between the output port of the low-pass filter and the input port of the digitally-controlled delay line.

5. Electro-optic modulator of claim 1,
wherein the modulation subunits are phase modulators, amplitude modulators, polarization modulators, injection modulators, or depletion modulators.

6. Electro-optic modulator of claim 1,
wherein an electrical driver is assigned to the downstream modulation subunit, said driver being configured to receive an electrical input signal and generate the electrical downstream modulation signal for the downstream modulation subunit.

7. Electro-optic modulator of claim 6,
wherein the driver is electrically arranged between the tunable delay line and the proximate end of the downstream electrode.

8. Electro-optic modulator of claim 6,
wherein the driver and the modulation subunits are integrated on the same chip.

9. Electro-optic modulator of claim 6,
wherein the driver, the modulation subunits and the tunable delay line are integrated on the same chip.

10. Electro-optic modulator of claim 6,
wherein the driver and the modulation subunits are integrated on the same chip and the tunable delay line is integrated on another chip.

11. Electro-optic modulator of claim 6,
wherein the driver and the modulation subunits are configured to operate based on receive differential or non-differential input signals.

12. Electro-optic modulator of claim 1,
wherein a controller is configured to activate and deactivate the phase-matching unit intermittently and operate the phase-matching unit in compensation cycles.

13. Electro-optic modulator of claim 12,
wherein a low-pass filter is arranged between an output port of the phase detector and an input port of the tunable delay line,
wherein an analog-digital converter is arranged between the output port of the low-pass filter and the input port of the tunable delay line,
wherein the tunable delay line is a digitally-controlled delay line, and
wherein the analog-digital converter is configured to store its digital values and output the stored values during the deactivation of the phase-matching unit until new analog values are provided by the low-pass filter in the next compensation cycle.

14. Electro-optic modulator of claim 1, comprising a plurality of modulation subunits being arranged in series, and a plurality of phase-matching units,
wherein each modulation subunit, except the last one in the series of modulation subunits, is an upstream modulation subunit in a pair of modulation subunits that is formed by the latter modulation subunit and the consecutive downstream modulation subunit,
wherein a phase-matching unit is assigned to each pair of modulation subunits, and
wherein each phase-matching unit is configured to delay the downstream modulation signal that is applied to the respective downstream modulation subunit such that the phase difference between the upstream modulation signal at the distal end of the upstream electrode of the upstream modulation subunit and the downstream modulation signal at the proximal end of the downstream electrode of the downstream modulation subunit is minimal.

15. Electro-optic modulator of claim 14,
wherein an electrical driver is assigned to each modulation subunit, each driver being configured to receive an electrical input signal and generate an electrical modulation signal for the respective modulation subunit, and
wherein for each modulation subunit, except the first one in the series of modulation subunits, the driver is electrically arranged between the proximate end of the electrode of the respective modulation subunit and a tunable delay line of the assigned phase-matching unit.

16. Electro-optic modulator for modulating optical radiation comprising at least one upstream modulation subunit, at least one downstream modulation subunit and at least one phase-matching unit, wherein the upstream and downstream modulation subunits are optically connected in series such that the optical radiation passes the downstream modulation subunit after passing the upstream modulation subunit, wherein the upstream modulation subunit comprises an upstream electrode, wherein a proximal end of the upstream electrode is adapted for receiving an electrical upstream modulation signal and located in an optical upstream section where the radiation enters the upstream modulation subunit, and wherein a distal end of the upstream electrode is located in an optical downstream section where the radiation leaves the upstream modulation subunit, wherein the downstream modulation subunit comprises a downstream electrode, wherein a proximal end of the downstream electrode is adapted for receiving an electrical downstream modulation signal and located in an optical upstream section where the radiation enters the downstream modulation subunit, and wherein a distal end of the downstream electrode is located in an optical downstream section where the radiation leaves the downstream modulation subunit, wherein the phase-matching unit is configured to delay the downstream modulation signal such that a phase difference between the upstream modulation signal at the distal end of the upstream electrode and the downstream modulation signal at the proximal end of the downstream electrode is minimal, wherein a first monostable is arranged between the distal end of the upstream electrode and a first input port of the phase detector, and wherein a second monostable is arranged between the distal end of the downstream electrode and a second input port of the phase detector.

17. Electro-optic modulator for modulating optical radiation comprising at least one upstream modulation subunit, at least one downstream modulation subunit and at least one phase-matching unit, wherein the upstream and downstream modulation subunits are optically connected in series such that the optical radiation passes the downstream modulation subunit after passing the upstream modulation subunit, wherein the upstream modulation subunit comprises an upstream electrode, wherein a proximal end of the upstream electrode is adapted for receiving an electrical upstream modulation signal and located in an optical upstream section where the radiation enters the upstream modulation subunit, and wherein a distal end of the upstream electrode is located in an optical downstream section where the radiation leaves the upstream modulation subunit, wherein the downstream modulation subunit comprises a downstream electrode, wherein a proximal end of the downstream electrode is adapted for receiving an electrical downstream modulation signal and located in an optical upstream section where the radiation enters the downstream modulation subunit, and wherein a distal end of the downstream electrode is located in an optical downstream section where the radiation leaves the downstream modulation subunit, wherein the phase-matching unit is configured to delay the downstream modulation signal such that a phase difference between the upstream modulation signal at the distal end of the upstream electrode and the downstream modulation signal at the proximal end of the downstream electrode is minimal, wherein an electrical driver is assigned to the downstream modulation subunit, said driver being configured to receive an electrical input signal and generate the electrical downstream modulation signal for the downstream modulation subunit, and wherein the driver and the modulation subunits are configured to operate based on receive differential or non-differential input signals.

18. Electro-optic modulator for modulating optical radiation comprising at least one upstream modulation subunit, at least one downstream modulation subunit and at least one phase-matching unit, wherein the upstream and downstream modulation subunits are optically connected in series such that the optical radiation passes the downstream modulation subunit after passing the upstream modulation subunit, wherein the upstream modulation subunit comprises an upstream electrode, wherein a proximal end of the upstream electrode is adapted for receiving an electrical upstream modulation signal and located in an optical upstream section where the radiation enters the upstream modulation subunit, and wherein a distal end of the upstream electrode is located in an optical downstream section where the radiation leaves the upstream modulation subunit, wherein the downstream modulation subunit comprises a downstream electrode, wherein a proximal end of the downstream electrode is adapted for receiving an electrical downstream modulation signal and located in an optical upstream section where the radiation enters the downstream modulation subunit, and wherein a distal end of the downstream electrode is located in an optical downstream section where the radiation leaves the downstream modulation subunit, wherein the phase-matching unit is configured to delay the downstream modulation signal such that a phase difference between the upstream modulation signal at the distal end of the upstream electrode and the downstream modulation signal at the proximal end of the downstream electrode is minimal, wherein a controller is configured to activate and deactivate the phase-matching unit intermittently and operate the phase-matching unit in compensation cycles.

* * * * *